(12) United States Patent
Kaan et al.

(10) Patent No.: US 7,366,769 B2
(45) Date of Patent: Apr. 29, 2008

(54) SYSTEM, METHOD AND COMPUTER PROGRAM PRODUCT FOR A UNIVERSAL COMMUNICATION CONNECTOR

(75) Inventors: Keith G. Kaan, Mason, TX (US); J. Thomas Provost, Round Rock, TX (US)

(73) Assignee: Schlumberger Technology Corporation, Houston, TX (US)

( * ) Notice: Subject to any disclaimer, the term of this patent is extended or adjusted under 35 U.S.C. 154(b) by 832 days.

(21) Appl. No.: 09/755,002

(22) Filed: Jan. 5, 2001

(65) Prior Publication Data

US 2002/0065941 A1    May 30, 2002

Related U.S. Application Data

(60) Provisional application No. 60/237,212, filed on Oct. 2, 2000.

(51) Int. Cl.
*G06F 15/16* (2006.01)
*G06F 15/177* (2006.01)
*G06F 15/173* (2006.01)

(52) U.S. Cl. .............. 709/218; 709/238; 709/220; 709/249

(58) Field of Classification Search .......... 709/249, 709/222, 220, 218, 238; 370/389, 395.31
See application file for complete search history.

(56) References Cited

U.S. PATENT DOCUMENTS

| | | | | |
|---|---|---|---|---|
| 5,483,640 A | * | 1/1996 | Isfeld et al. | 709/213 |
| 5,802,278 A | * | 9/1998 | Isfeld et al. | 709/249 |
| 5,848,233 A | * | 12/1998 | Radia et al. | 713/201 |
| 5,864,772 A | | 1/1999 | Alvarado et al. | |
| 5,867,666 A | * | 2/1999 | Harvey | 709/239 |
| 5,883,890 A | * | 3/1999 | Okanoue et al. | 370/338 |
| 5,983,269 A | * | 11/1999 | Mattson et al. | 709/221 |
| 6,167,052 A | * | 12/2000 | McNeill et al. | 370/399 |
| 6,172,986 B1 | * | 1/2001 | Watanuki et al. | 370/466 |
| 6,286,038 B1 | * | 9/2001 | Reichmeyer et al. | 709/220 |
| 6,295,556 B1 | * | 9/2001 | Falcon et al. | 709/220 |
| 6,298,057 B1 | * | 10/2001 | Guy et al. | 370/389 |

(Continued)

*Primary Examiner*—William Vaughn
*Assistant Examiner*—Kristie D Shingles
(74) *Attorney, Agent, or Firm*—Osha Liang LLP

(57) ABSTRACT

In one embodiment a system for managing communication on a network includes a host connected to a LAN. In a particular embodiment, the host is in a mobile data acquisition unit for a well-logging operation. The host acquires data from a data acquisition device such as a down-hole transmitter is also connected to the LAN. There is also a router connected to the LAN for connecting to the WAN. The system provides for easily configuring and re-configuring the router, to accommodate the variations in parameters for changing from one network interface device to another. In one aspect the router has a configuration file for performing an initial, automatic configuration when the router is booted. The host has a processor and a storage unit with a software program stored in the storage unit. The configuring of the router by the bootable configuration file enables the router to communicate with the host program so that a user can select a network connection type using an interface of the program on the host, and the program can then further automatically configure the router with parameters for the selected connection type. Despite changes in network connections, the hosts on the LAN do not have to change configuration to communicate on the WAN.

23 Claims, 11 Drawing Sheets

U.S. PATENT DOCUMENTS

| | | | |
|---|---|---|---|
| 6,438,606 B1* | 8/2002 | Ward | 709/238 |
| 6,473,857 B1* | 10/2002 | Panas et al. | 713/2 |
| 6,577,634 B1* | 6/2003 | Tsukakoshi et al. | 370/395.31 |
| 6,587,874 B1* | 7/2003 | Golla et al. | 709/220 |
| 6,636,498 B1* | 10/2003 | Leung | 370/338 |
| 6,654,797 B1* | 11/2003 | Kamper | 709/220 |
| 6,724,757 B1* | 4/2004 | Zadikian et al. | 370/388 |
| 6,751,191 B1* | 6/2004 | Kanekar et al. | 370/217 |
| 6,751,663 B1* | 6/2004 | Farrell et al. | 709/224 |
| 6,757,289 B1* | 6/2004 | Cain et al. | 370/401 |
| 6,760,339 B1* | 7/2004 | Noel et al. | 370/401 |
| 6,775,694 B1* | 8/2004 | Fougerat | 709/218 |
| 6,778,523 B1* | 8/2004 | Masilamany | 370/351 |
| 6,859,452 B1* | 2/2005 | Crooks | 370/355 |
| 6,938,089 B1* | 8/2005 | Slaby et al. | 709/229 |
| 7,143,151 B1* | 11/2006 | Kayashima et al. | 709/223 |
| 2001/0042147 A1* | 11/2001 | Adams et al. | 710/100 |
| 2002/0057657 A1* | 5/2002 | La Porta et al. | 370/331 |
| 2006/0203804 A1* | 9/2006 | Whitmore et al. | 370/352 |

* cited by examiner

SYSTEM, METHOD AND COMPUTER PROGRAM PRODUCT FOR A UNIVERSAL COMMUNICATION CONNECTOR

CROSS-REFERENCE TO RELATED APPLICATION

This application is related to provisional application Ser. No. 60/237,212, filed Oct. 2, 2000 entitled "Universal Communication Connector," which is assigned to the same assignee as the present application, and is hereby incorporated herein by reference.

BACKGROUND OF THE INVENTION

1. Field of the Invention

The present invention is related generally to network communication, and more particularly to configuring and re-configuring a router to accommodate variations in parameters for changing from one network interface device to another for the router's network connection.

2. Related Art

For data-intensive service operations where the operations are in many, widely-distributed locations, such as where data is logged for well drilling or production, it is conventional that the service provider has centralized information handling resources which are physically distant from the remote data acquisition sites but accessible by a wide area network ("WAN"). From time to time at least some of the data logged at one of the remote sites needs to be sent to the information handling resources via the WAN. Also, the remote location sometimes needs to be served by the information handling resources via the WAN.

In an application like this, the WAN may be a private network, but it is convenient for it to at least be compatible with the Internet. That is, being a private network, the network does not handle messages sent from outside the network to recipients who are also outside the network. However, with respect to Internet compatibility, the network does permit communication between hosts on the private network and hosts on the Internet outside the private network. Therefore, to facilitate this compatibility with the outside world, hosts on the private WAN may be assigned IP addresses from among the public IP addresses available for Internet communications. This presents a problem due to the large number of data acquisition sites, and even larger number of hosts, since each data acquisition site typically has its own local area network to which numerous hosts are connected. Purchasing and maintaining public IP addresses for all these hosts may be very expensive.

Task priorities and scarcity of public IP addresses may lead to another problem. In the context of well logging, data acquisition is usually a much higher priority than connecting to the WAN and centralized information handling resources. That is, data acquisition sites for well logging are commonly mobile units that connect and disconnect from the network as they travel from one well location to another. Establishing a link to the WAN at a remote location takes time, whereas there may be a pressing need for data acquisition to commence immediately upon a mobile data acquisition unit arriving at the location. So the service provider's technician may immediately set up one or more data acquisition hosts on a local area network ("LAN") in the mobile unit, with attendant IP address, subnet mask and gateway assignments. Then, once the service provider's technician has begun data logging, he or she may turn to establishing a WAN link, such as by setting up a satellite dish.

Moreover, to conserve the number of public IP addresses used by the service provider, it is common that non-public IP addresses are assigned to one or more of the hosts on the LAN. Thus, once the WAN equipment is in place, the IP address for one of the hosts may have to be changed to one of the public IP addresses so that the host can communicate on the WAN. When the host is performing well logging by communicating with down-hole data transmitters on the LAN, changing the host's IP address temporarily disrupts communication between the host and the transmitters. Obviously it is disadvantageous to interrupt well logging in order to initiate communication on the WAN.

Another problem that must be dealt with for this system concerns security. That is, an extensive private WAN such as this greatly improves communication between the data acquisition sites and other information handling resources, but it also gives rise to security issues. In this context security is particularly important, since the data collected for a client at a remote location ordinarily has great commercial value. Security difficulties are aggravated in the particular circumstances of the present invention because of the mobile units connecting and disconnecting from the network.

From this background it should be appreciated that there are a number of problems which need to be addressed to manage connection of data acquisition sites to a network.

SUMMARY

The foregoing needs are addressed in the present invention as follows. In one embodiment, a system for managing communication on a network includes a host connected to a LAN. In a particular embodiment the host is in a mobile data acquisition unit for a well-logging operation. The host acquires data from a data acquisition device, such as a down-hole transmitter, that is also connected to the LAN. There is also a router connected to the LAN for connecting to the WAN.

Mobile data acquisition units tend to move about from day-to-day. Even though the WAN is consistent at the Internet protocol layer from one location to the next, the connection type, such as Ethernet, Dialup analog, Satellite. Wireless networks, etc., needed from one location to the next may vary. Since data acquisition personnel have expertise in fields other than network interfacing, they are not well suited to handle frequent changing of network interface parameters. It is therefore advantageous for the system to facilitate easily making interface connections for the variety of network types. This could be achieved by having a dedicated router pre-configured by a router/network-interfacing expert for each respective network interface device, however, this would be expensive. In contrast, according to an embodiment of the present invention network interface devices are provided for a variety of connections to the WAN, but only the one router is connected directly to the LAN. However, the system advantageously provides for easily configuring and re-configuring the router, even by a non-expert, to accommodate the variations in parameters for changing from one network interface device to another. In one aspect of an embodiment, the router has a configuration file for performing an initial automatic configuration when the router is booted.

The host has a processor and a storage unit with a software program stored thereon. The configuring of the router by the bootable configuration file enables the router to communicate with the host program so that a user can select a network connection type using an interface of the program on the host, and the program can then further automatically configure the router with parameters for the selected connection type. When it is configured for communication with the program the router may be referred to herein as a Universal Communication Connection Device ("UCCD"). Accordingly, the program includes, in one embodiment, a UCCD Manager program.

In one embodiment, in case the router is not pre-loaded with the initializing bootable configuration file, the UCCD Manager program has instructions that operate with the host processor to login to and configure the router, in order to make the router recognizable by the host on the LAN and enable the further configuring for the selected network connection type.

Furthermore, in an additional aspect of an embodiment, the invention is advantageous in that despite changes in network connections, the hosts on the LAN do not have to change configuration to communicate on the WAN. That is, the system provides for automatically configuring the router to substitute a network address of the router in place of a network address of the host, so that the host can communicate to the WAN. Any change in configuration to accommodate a change in network connections can be made in the router, preserving the configuration of the host, that is, without changing the host configuration. In one embodiment, this configuring is also done by the configuration file upon booting the router. In one embodiment, this is done at least partly by the UCCD Manager program. This is advantageous because this translation of addresses tend to hide the devices on the LAN from the WAN, which helps conserve public network addresses. Furthermore, by permitting the configuration of hosts on the LAN to remain static, communication is not disrupted between a host and a data acquisition device on the LAN even during configuring for a new network connection to the WAN.

In another aspect, the UCCD manager program also includes instructions for querying and for monitoring the mobile unit router.

In a still further aspect, the router is connected to the WAN via a second router. The second router supports one or more hosts on a second LAN. Neither the first nor the second router automatically updates, in its respective router table, nodes (i.e., devices which can communicate on a network. e.g., hosts and data acquisition devices) on either the first or the second LAN.

In a further aspect of hiding devices on the first LAN from the WAN, the first router is configured not to send to other routers in the WAN a table of IP addresses of nodes on the first LAN. In various embodiments this configuring may be done by the bootable configuration file or the UCCD Manager program.

It is another advantage of the foregoing that the first router isolates the first LAN from the WAN connection, so that if there are problems on the WAN, the nodes on the first LAN are not exposed to them. Numerous additional aspects of the system in general, and the UCCD Manager program in particular, are described in further detail in the following.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In the following detailed description of the preferred embodiments, reference is made to the accompanying drawings illustrating embodiments in which the invention may be practiced. It should be understood that other embodiments may be utilized and changes may be made without departing from the scope of the present invention.

FIG. 1

Figure 1:
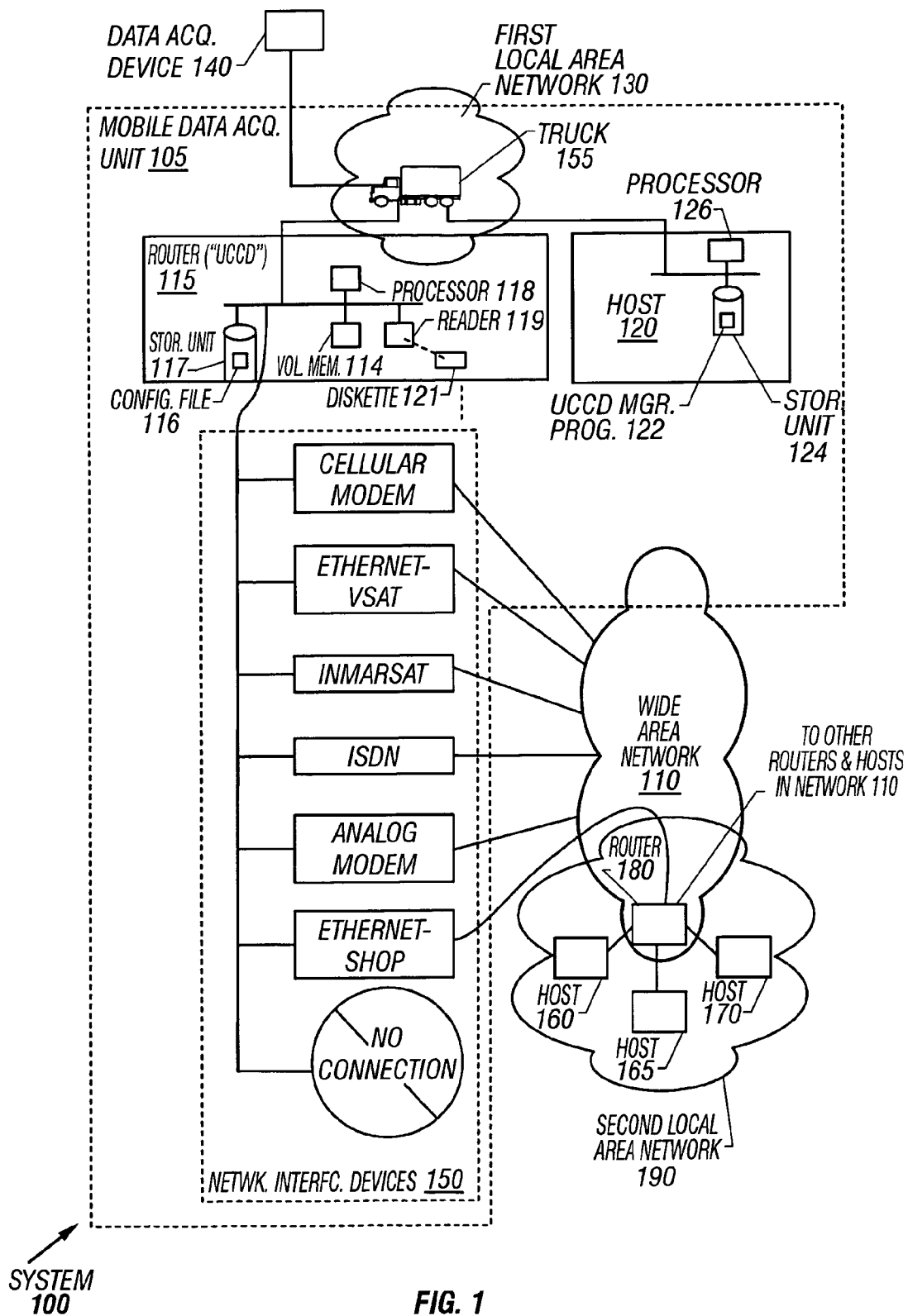
FIG. 1 shows a system 100 for managing a network connection between a data acquisition site and a WAN, according to an embodiment of the present invention.

Referring now to FIG. 1, a system 100 is shown for managing a network, according to an embodiment of the invention. In this embodiment, the system 100 includes a mobile data acquisition unit in a truck 155. The system 100 includes a host 120 in the unit 105 connected to a first LAN 130. The host 120 acquires data from a data acquisition device 140, such as a down-hole transmitter, that is also connected to the LAN 130. There may be numerous hosts 120 and data acquisition device 140 connected to the LAN 130, although for illustration only one of each is shown. The system 100 assists in managing a number of network connections, including for example, a connection between the first network 130 and the WAN 110, which in the embodiment of FIG. 1 includes a connection between the first network 130 and a second LAN 190.

Mobile data acquisition units such as unit 105 move about from day-to-day. Even though the WAN 110 is consistent at the Internet protocol layer from one location to the next, the connection type, such as Ethernet, Dialup analog, Satellite. Wireless networks, etc., needed from one location to the next may vary. That is, different network interface devices 150 may be needed from one location to the next, and the parameters for the various network interface devices 150 vary at the physical and data link layers.

In the embodiment of FIG. 1, network interface devices 150 are provided for a variety of connections to the WAN 110, but only a single router 115 is connected directly to the LAN 130. The router 115, however, is advantageously easy to configure and re-configure, even by a non-expert, to accommodate the variations in physical and data link parameters. The router 115 also isolates the mobile LAN 130 from the WAN 110 connection, so that if there are problems on the WAN 110, the nodes on the LAN 130 are not exposed to them.

In the embodiment of FIG. 1, the router 115 has a configuration file 116 stored on a storage unit 117 of the router 115, that automatically configures the router 115 to be recognizable by the host 120 as a UCCD (and therefore also referred to as UCCD 115) on the LAN 130 when the router 115 is booted. That is, the configuration file 116 contains instructions, which are automatically executed by a processor 118 of the router 115 upon booting, and which thereby perform configuring operations. This configuring includes causing the router to be assigned a certain IP address, subnet mask and default gateway with which hosts 120 and data acquisition devices 140 on the LAN 130 are configured to communicate.

In one embodiment, the router 115 also has a reader 119, such as a disk drive, for reading a portable storage device, such as a diskette 121 or compact disk. According to this embodiment, the configuration file 116 is stored on the removable storage device.

According to another configuring aspect, the host 120 has a processor 126 and a storage unit 124 with a UCCD Manager software program 122 stored thereon. This UCCD Manager software 122 has instructions which the host 120 uses to initiate a connection through a network interface device 150 to the WAN 110. The UCCD Manager program 122 also has instructions that operate with the processor 126 to further configure the router 115. That is, besides the router 115 being configured by the configuration file 116 to be recognizable by the host, etc., as was described above, the router is also configurable from the host 120, via the UCCD Manager program 122, to properly to communicate with the WAN 110. That is, it was described above that the router 115 is automatically configured by the bootable configuration file 116 for recognition by the mobile unit host 120, but in an alternative embodiment, the router 115 is configured by the UCCD Manager program 122 instead of, or in addition to the router 115 booting a configuration file 116.

The UCCD Manager program 122 provides a set of menus and windows for the user to select the type of connection to be made. The UCCD manager has a point and click user interface that is installed via a conventional CDROM using the industry standard "setup.exe" installation procedure. Once the connection type is specified and the user clicks "connect," the user can then observe the UCCD Manager program 122 do the following: configure the router 115 appropriately, instruct the router 115 to make the connection, test each step as the connection progresses, and finally test data transmission over the newly established link. If anything goes wrong during the connection setup, messages and dialog boxes appear to help the user diagnose the problem.

As stated above, in one embodiment, numerous hosts 120 nay be on LAN 130. According to this embodiment, once a connection through an interface device 150 is established, any node on the LAN 130 can access any IP based application elsewhere on the LAN 130 or the WAN 110. IP applications include web browsers, Telnet, E-mail, FTP, InterACT, TransACT, etc. Multiple nodes can share this network connection. For instance, two hosts 120 on the LAN 130 can share the same connection and be transmitting and/or receiving data essentially simultaneously.

While the hosts 120 and data acquisition devices 140 have private network address that are not recognizable by, or that may conflict with a network address of another device on the WAN or on the Internet, the network address of the router 115 is a unique public address that is compatible with the WAN 110 and does not conflict with hosts one the WAN 110, such as hosts 160, 165 and 170. In one embodiment, this includes addressing compatibility not only with hosts on a private WAN 110, but also with hosts on the Internet.

In order to deal with the foregoing compatibility issues, the router 115 is also configured to substitute a network address of the router 115 in place of a network address of the host 120, so that the host 120 can communicate to the WAN 110. This translating, wherein the router's address is substituted for that of nodes on the mobile unit LAN 130, the router 115 essentially "hides" the other nodes from the WAN 110. That is, the nodes can initiate connections to the WAN 110, including the Internet, but no one can connect to them. This security feature makes use of a known Network Address Translation (NAT) convention. The steps necessary to configure NAT on a router conventionally require numerous commands, but according to an embodiment of the present invention, the user can cause this configuring to occur automatically by a single click of a button on an interface display of the UCCD Manager 122.

Since some of the mobile unit acquisition hosts 120 need to occasionally run "servers" to which hosts within the service provider's WAN 110 will connect (data transfer services with TransACT for example), the UCCD Manager program 122 also provides the ability to alternatively expose a LAN 130 host 120 to the outside and thus allowing inbound connections to it.

Routers are conventionally configured to automatically monitor and update themselves and other routers in the network regarding identity of newly connected hosts on the network. As a result new hosts in the network are automatically recognized so that they can communicate with other hosts in the network. According to an embodiment of the present invention, the convenient result of automatic updating is forgone for the router 115 in the LAN 130, in order to achieve improved security. Also, the router 115 is connected to the WAN 110 via a second router 180. The second router 180 is in a shop and supports a number of hosts 160, 165 and 170 on a second LAN 190 for the shop. Neither the mobile router 115 nor the shop router 180 automatically updates, in its respective router table, nodes (i.e, devices which can communicate on a network, e.g., hosts and data acquisition devices) on either LAN 130 or LAN 190.

While this security arrangement helps prevent unauthorized hosts from gaining network access, it also presents a problem for communicating with hosts newly connected to the network. Without the mobile router hiding from the WAN those other devices that are on the mobile unit LAN, this security arrangement poses a particularly acute problem for the present network, since, as stated above, mobile units frequently connect to and disconnect from the network, and they may have numerous hosts. In a further aspect of the "hiding" of LAN 130 nodes from the WAN 110, the mobile router 115 hides the nodes by not sending to other routers in the WAN 130 a table of IP addresses of the devices on the mobile LAN 130.

FIG. 2A

Figure 2A:
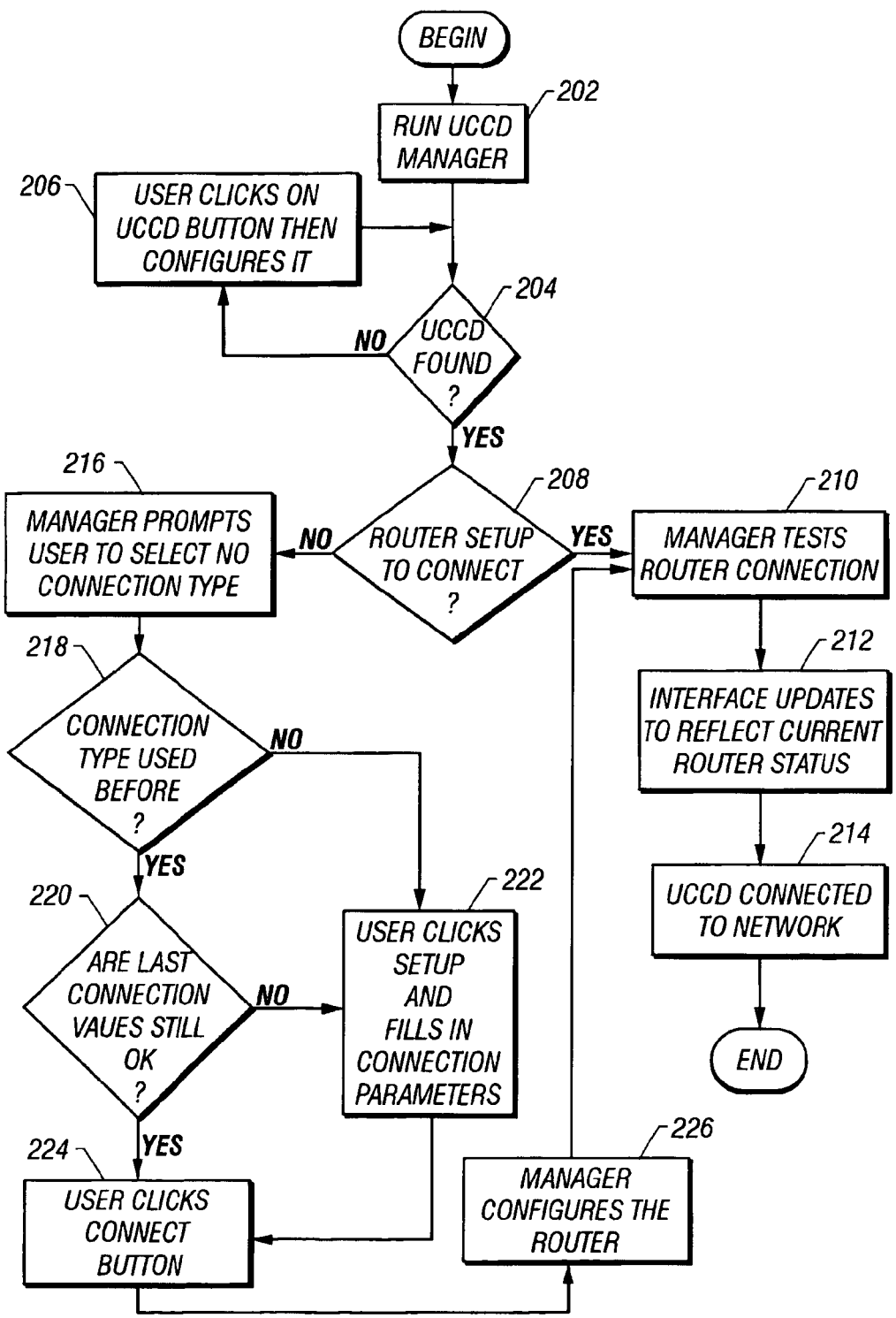
FIGS. 2A, 2B and 2C illustrate, in flow chart form, certain method steps according to an embodiment.

Referring now to FIG. 2A, method steps are shown for aspects of configuring the router by the UCCD Manager program according to an embodiment. Upon physically connecting the router 115 (i.e, "UCCD") (FIG. 1) to the WAN 110 (FIG. 1), for example by a phone line for dialup, or by an Ethernet cable to a satellite ("VSAT") network interface device 150 (FIG. 1), method steps for the UCCD include the following:

At 202 in FIG. 2A, run the UCCD Manager application 122 (FIG. 1) on one of the hosts 120 (FIG. 1), If the router 115 is not recognized by the application 122 at 204 as being properly configured as a UCCD, then the user is presented a choice for selecting at 206, via an interface in the program 122 described hereinbelow, to configure the router 115 properly. Once initial configuring of the router 115 as a UCCD is done, the application 122 displays the current type of network connection the UCCD is configured for, and presents the user a choice at 208 to accept the type of connection or change it. If the user chooses to accept the current type of connection then at 210 the UCCD Manager application 122 tests the router 115 connection, and at 212 updates the Manager 122 display to show status. At 214 the router 115 is connected to the router 180 on LAN 190 and thus to the WAN 110. (It should be understood that since router 180 is connected to the WAN 110, if the router 115 has a network connection to router 180 router 115 and the nodes on LAN 130 are thus connected to the WAN, although as has been previously described, the router 115 may hide the nodes on the LAN 130 from the WAN 110.)

If the user chooses at 208 not to accept the current connection type, then at 216 the Manager 122 prompts the user to select which type is desired. Once the user selects the types, the Manager 122 at 218 determines whether the selected type of connection has been used before and if it has been used, the Manager 122 displays at 220 whatever parameters are currently set, and gives the user a choice whether to accept the settings. If the selected connection type has not been used before, or the user chooses not to accept settings currently set for a type used before, then at 222 the user fills in parameters for the connection type. At 224 the user initiates a connection by clicking a button on the Manager 122 interface. The Manager 122 then configures the router 115 at 226 according to the choices made, and proceeds to step 210, previously described.

FIG. 2B

Figure 2B:
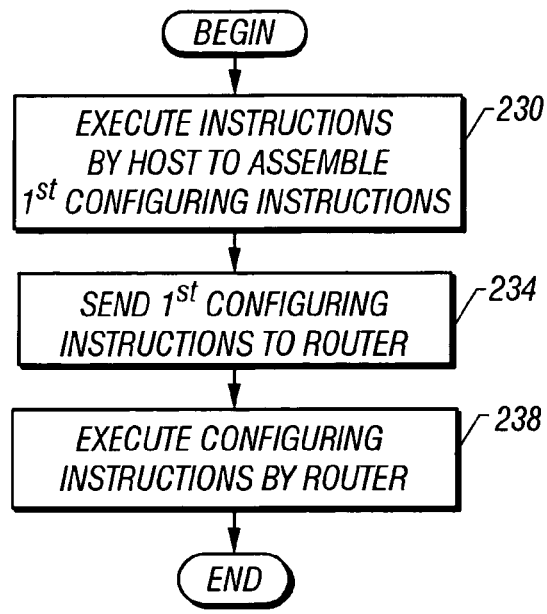

Referring now to FIG. 2B, additional method steps are illustrated according to an embodiment. In a first step, 230, instructions, i.e., the Manager program 122 instructions, are executed by the host 120 (FIG. 1), to assemble first configuring instructions 375 (FIG. 3) for the router 115 (FIG. 1) from a template file 365 (FIG. 3), (It should be understood that the term "instructions" as used herein, such as to describe that which is assembled for executing by the router 115, may include parameters and router commands.)

Next, in step 234, the first configuring instructions are sent by the host 120 via the first network 130 (FIG. 1) to the router 115. Next, in step 238, configuring instructions are executed by the router, including the first configuring instructions 375. The configuring instructions executed by the router could also include other instructions. For example, they could include instructions 116 (FIG. 1) that the router executed upon booting.

According to an embodiment, Step 238 includes the result of executing the configuring instructions by the router, that is, a step of configuring the router and establishing communication between the host 120 and the router 115. As previously stated, it is advantageous that the configuring does not disrupt network communication between the host 120 and the data acquisition device 140 on the LAN 130.

FIG. 2C

Figure 2C:
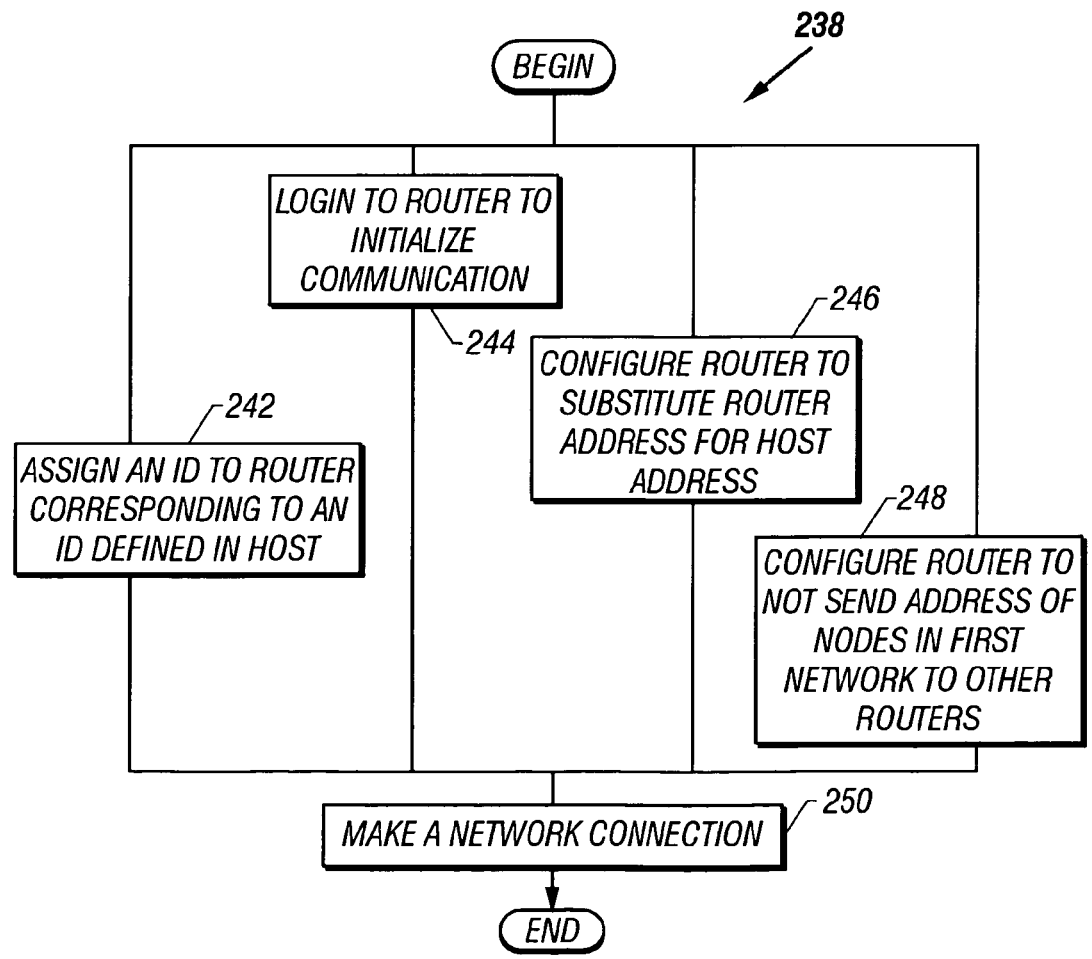

Referring now to FIG. 2C, additional aspects of step 238 are illustrated according to an embodiment. Although steps 242-248 are shown preceding step 250, it is not intended that FIG. 2C implies any particular sequence of the steps. That is, some of the steps could occur before others in one embodiment, but not in another. Some steps may not occur at all. Also, to some extent the sequence of steps is determined by a user's interaction with the Manager program 122 (FIG. 1).

In connection with step 242, it should be understood that the host 120 has a predetermined configuration, including parameters 530 (FIG. 5) defining a certain identity. That is, the parameters 530 define an identify for a node that the host 120 will recognize on the LAN 130. In an aspect of the configuring of step 238, according to step 242 the certain identity is assigned to the router 115, so that the network communication between the host 120 and the router 115 is established by the host 120 recognizing the router identity defined by the parameters 530, (It should be understood that the term "network communication" as used herein, refers to communication at the network layer or above, in OSI specification terms.)

Figure 6:
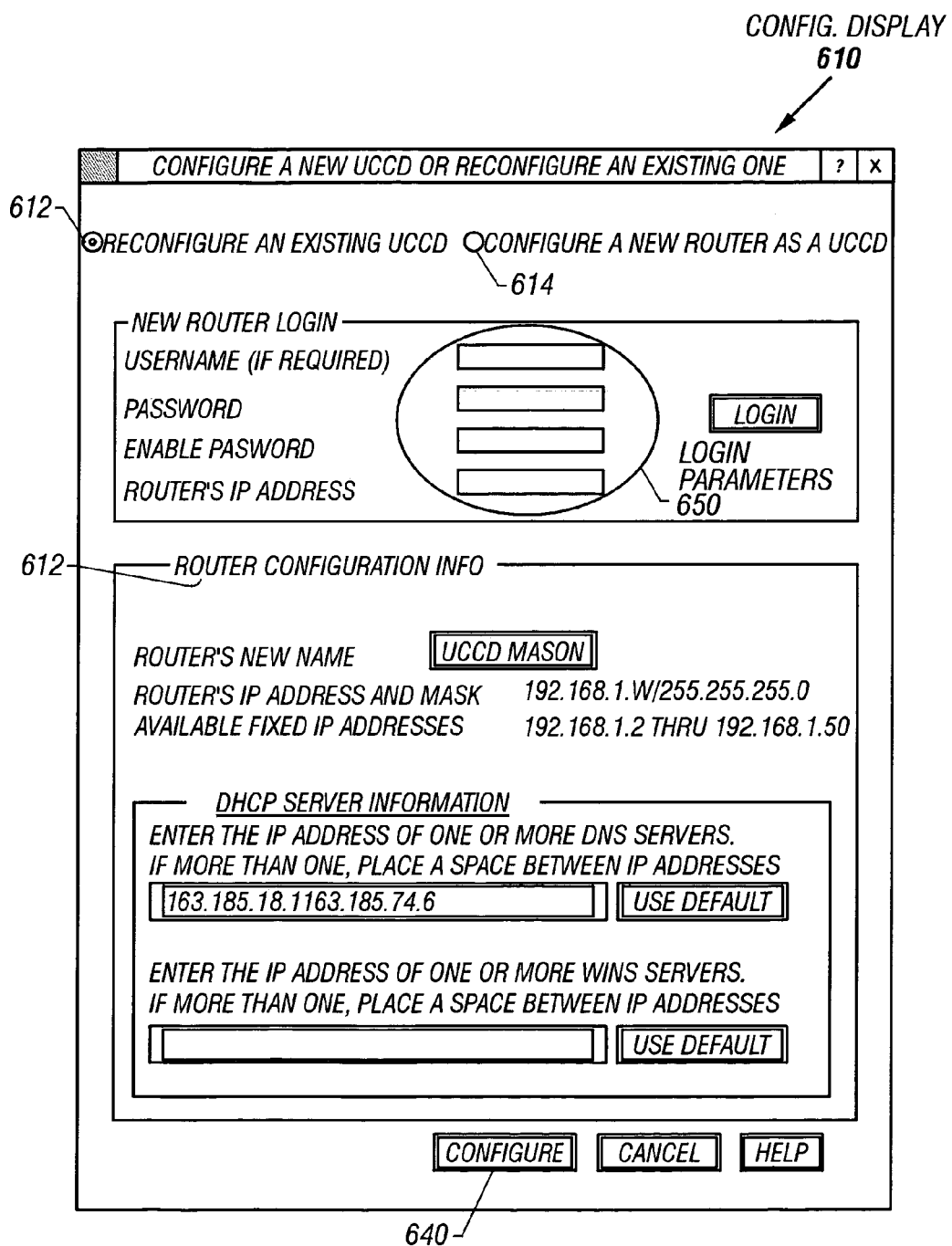
FIG. 6 illustrates an initialize display of the Manager program.

In step 244, the configuring of step 238 that results from the router executing the configuring instructions includes the host 120 logging in to the router 115 to initialize the network communication on the LAN 130 between the router 115 and the host 120. This is done using log-in parameters such as shown in FIG. 6, parameters 650.

Figure 7:
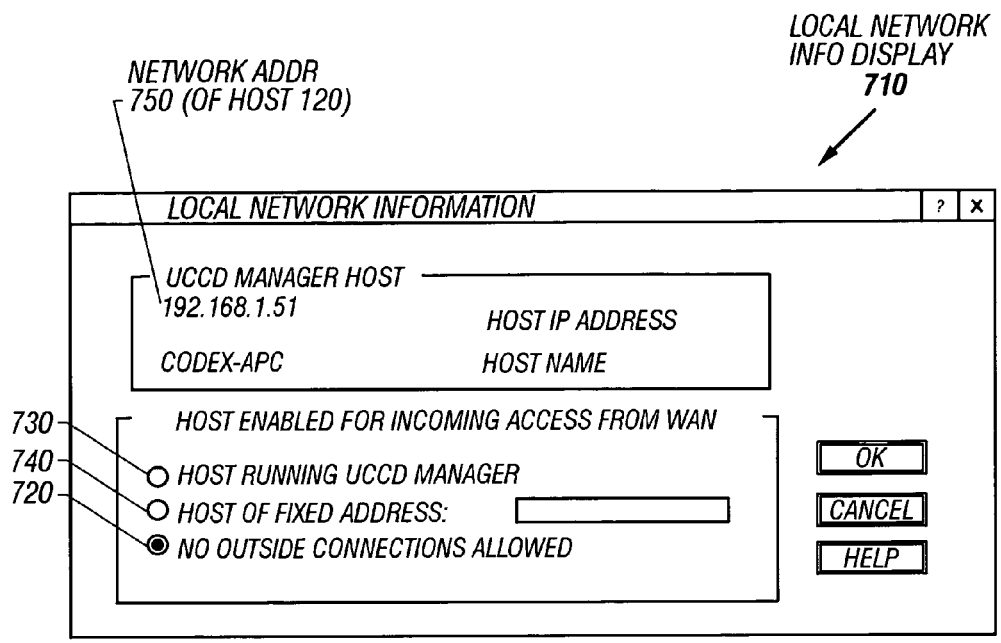
FIG. 7 illustrates a local area network information display of the Manager program.

In step 246, the router 115 is configured to substitute a network address of the router 115, for example, an address included in parameters 530 described in the preceding paragraph, in place of a network address of the host 120. This enables communicating between the host 120 and one of the second network hosts, such as host 160 or one of the others on LAN 190 or WAN 110. An example of such a network address for the host is shown in FIG. 7, parameters 750.

In step 248, the router 115 is configured to not send addresses of nodes in the first network, e.g., an address included in parameters 750, to other routers, such as to one of the routers 160, etc, in LAN 190 and WAN 110.

In step 250, the router 115 is configured to make a network connection to the LAN 130, and hence the WAN 110, so that the network communication between the hosts such as hosts 160, etc, and the router 115 is established by the hosts 160, etc, recognizing the router 115 identity via the network connection. This includes setting parameters in the router 115 such as parameters 1210 of FIG. 12 to establish the connection.

FIG. 3

Figure 3:
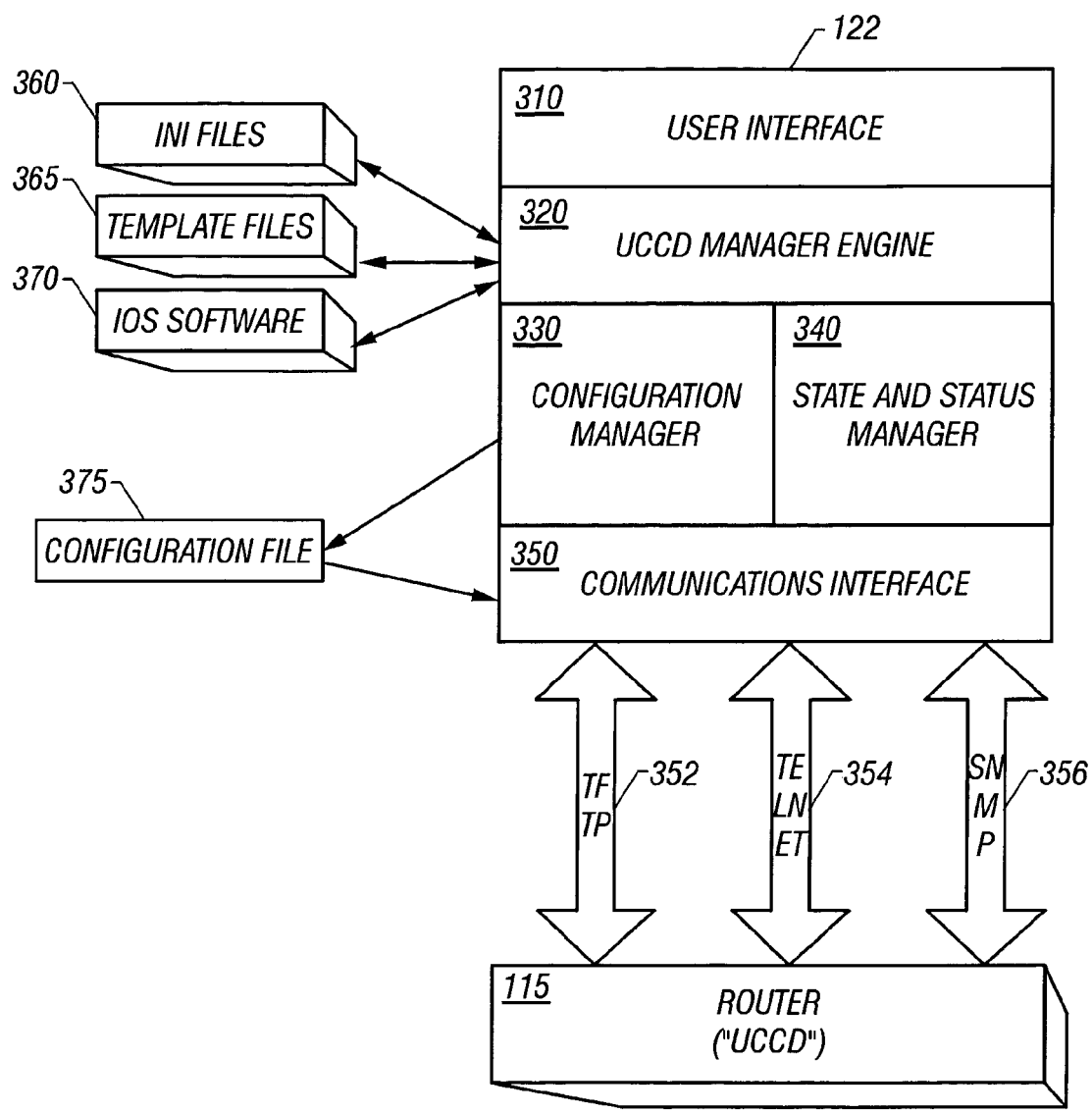
FIG. 3 illustrates certain more detailed aspects of the structure and functioning of the system 100, including the UCCD Manager software program according to an embodiment.

Referring now to FIG. 3, structure and functioning are shown in more detail for aspects of the system 100, including the UCCD Manager program 122, according to an embodiment. Inside the Manager application 122, there are five functional pieces.

The User Interface 310 is a Windows based application that presents various context sensitive windows that make it easy for users to setup and select a variety of network connections. The Interface 310 is color sensitive to make is easy to see the status of a connection and take appropriate action if necessary. It provides real-time data flow metrics, on-line help (both from the pull down menu and also context sensitive help). It also provides debugging aids to assist the user if serious problems occur.

The Manager Engine 320 provides an interface among the User Interface 310, and modules described below that configure the router 115 and monitor state and status information, and initialization ("INI") files 360, template files 365 and input/output software 370 for use in the router reconfiguration process. The INI files 360 and tern files 365 provide detailed data necessary to program the router 115, store user configuration information, and maintain listings of supported configurations that have been tested and known to work. More specifically, the INI files 360 contain groupings of Variable names and their associated values, while template files 365 contain router 115 operating system commands with variables that are interpreted prior to downloading to the router 115.

Users do not interact directly with the files 360 or 365. The Manager application 122 does this on the user's behalf as the user makes connection selections from the graphical User Interface 310. The Manager Engine 320 does not communicate directly with the router 115, but interfaces with modules described below to send and receive data from the router 115.

The Configuration Module 330 assembles instructions, which may include commands and parameters, to be sent to the router 115. The instructions may be sent as a file to download or merely as individual commands or a series of commands to be issued to the router 115. The bulk of the configuration of the router 115 that is done by the Manager program 122 is handled by downloading in TFTP protocol 352 a pre-defined configuration file 375 containing multiple router 115 commands. To construct such a file for downloading, the Configuration Module parses the template files 365 and INI files 360. In one embodiment, these files 360 and 365 are stored on the storage unit 124 (FIG. 1) when the UCCD Manager program 122 is installed on the host 120.

Below are two examples of template files 365 used by the UCCD Manager. Each file contains one or more router 115 operating system commands.

When the Manager 122 is called upon to download a configuration, the Manager Engine 320 locates the appropriate template file 365 and the Configuration Module 330 begins parsing through the file 365 line-by-line. Commands preceded with an "!" are treated as comment lines. Each line can contain one or more variables. Variables requiring parameter substitution are enclosed with square braces. When the parser encounters a set of square braces, it looks up the particular variable in memory or the local or common UCCD.ini file, and substitutes the current value for the variable. If no variable is found (an error condition), the line is written to the output file as a comment with an attached error message. If another template file is referenced within the current file being read by the Manager 122, the file reference is preceded with a "#". If the parser encounters a "#", it treats the remainder of the line as a filename, and then recursively processes that file as well.

---

1605R- Sync-async.txt

!Configuration script for a 1605R router with
!a Serial WIC card and used to connect an Async
!device to the Serial0 interface
!
interface Ethernet0
template-Ethernet_LAN txt
!
interface Ethernet1
template-Interface_Shutdown txt
!
interface Serial0
    physical-layer async

---

-continued

1605R- Sync-async.txt template-Serial.txt
!
Line 1
template-Line txt
!
template-SNMP txt
!
end

---

Template-Serial.txt description Analog Modem, Cellular Modem or Inmarsat ASD Connection
    ip address negotiated
    ip nat outside
    ip access-group 111 in
    no ip route-cache
    no cdp enable
    encapsulation ppp
    ppp authentication chap pap callin
    !ppp chap hostname <Username> -- this is passed in later
    !ppp chap password <Password> -- this is passed in later
    pulse-time [DTRPulseTime]
    no dialer
    dialer [DialMethod]
    !dialer idle-timeout <IdleTimeout> -- passed in at connect time
    dialer enable-timeout [WaitForRetry]
    dialer wait-for-carrier-time [WaitForCarrier]
    !dialer string <PhoneNumber0> -- this is passed in later
    dialer-group 1
    crypto map regmap
! no shutdown
!
!Setup Easy IP - ie Port address translation
ip nat inside source list 100 interface [DefaultRoute-Current] overload

---

A file 375 is produced as a result of the above described parsing. The file 375 has instructions compatible with the router 115 operating system format that can be downloaded to the router 115 via TFTP protocol 352 from within the Manager application 122. The Communications Module 350 has controls that supplies the TFTP protocol 352, as well as the Telnet and SNMP protocols, so after the Configuration Module 330 assembles the file 375, the Communications Module 350 handles the downloading. The controls handle setup and tear-down of connections, transmission of data, and error reporting of the connection itself. The interface of the Manager program 122 on host 120 to the router 115 is done via an Ethernet link on the LAN 130. The router 115 supports several IP protocols. TFTP (Trivial File Transfer Protocol) is used to download software and configuration files to and from the router 115. Telnet is used to send individual commands to the router 115 and monitor important console messages. SNMP (Simple Network Management Protocol) is used to watch the router 115 for events and to query and set various router 115 parameters and states. The commands and messages sent between the router 115 and the Manager software 122 are router 115 commands and file downloads that a "router expert" would perform by logging into a router and issuing a series of commands, then analyzing the output to ensure all is well.

The UCCD Manager program 122 also monitors the mobile unit router 115. That is, the State and Status Module 340 captures error messages and router events via the Communications Module 350 and passes them to the Manager Engine 320 for processing. SNMP protocol 356 is used to check and toggle the state of interfaces. Telnet protocol 354 is used to send individual commands to the router 115 to make small updates or query for information not provided by SNMP 356.

FIG. 4

Figure 4:
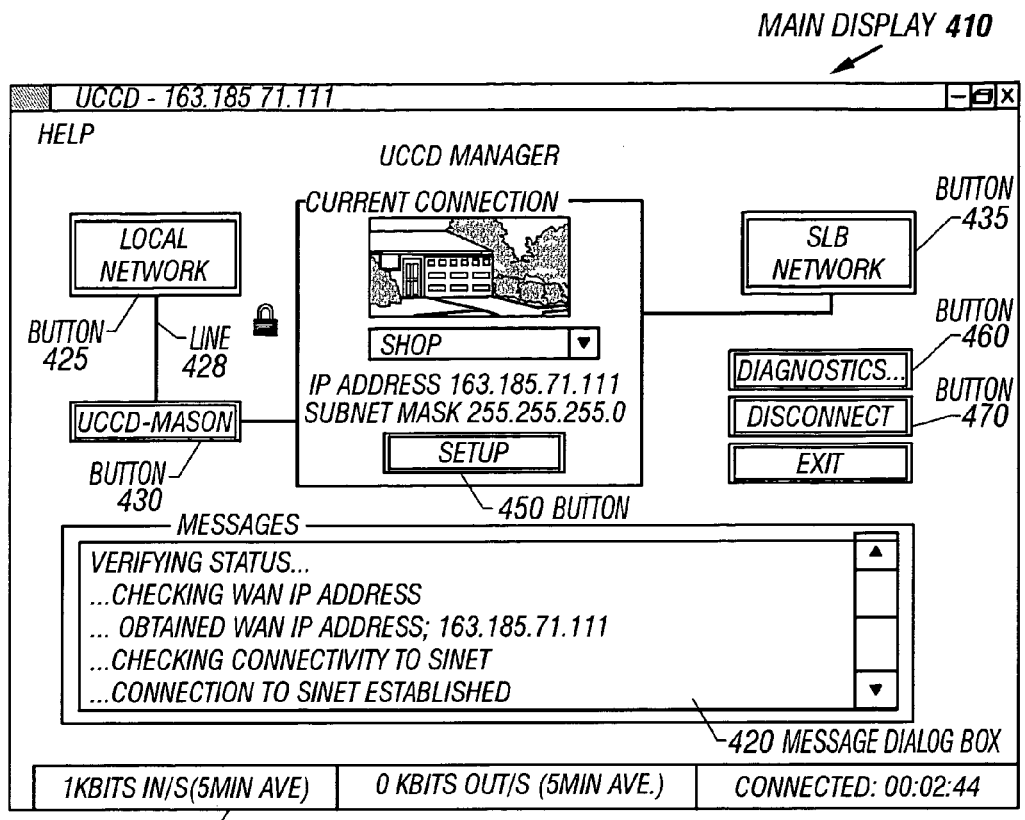
FIG. 4 illustrates a main UCCD interface display of the Manager program.

Referring now to FIG. 4, a main UCCD interface display 410 is shown. This display 410 is shown when the UCCD manager 122 (FIG. 1.) is invoked. The first display 410 represents components from the users network 130 (FIG. 1.), to the UCCD router 115 (FIG. 1.), through network interface devices 150, then finally on to the connection to the WAN 110 (FIG. 1.). Components such as the host 120 (FIG. 1.), the router 115 in the network 130 and the SLE Network 435 are clickable buttons, which allow the user to interrogate the various components and change parameters.

The Manager program 122 searches the network 130 (FIG. 1) for a UCCD 115 (FIG. 1). If found the Interface 310 (FIG. 3) reports information in the "Messages" dialog box 420, and turns the line 428 between the Local network connection button 425 to the UCCD button 430 to green. According to the embodiment, in display 410 line colors change with connection status, and button labels become enabled or disabled appropriately. The message window 420 displays a scrolling list of information messages and error conditions.

The status bar 440 at the bottom of the display 410 shows data rates flowing through the UCCD to and from the WAN 110 and also the connection up time.

The lines such as line 428 on the display 410 represent connections between various components and are color coded. RED indicates a connection is down. YELLOW indicates a wait state (waiting to dial for example). GREEN indicates an active connection.

When minimized and visible in the Windows Toolbar, an icon for display 410 is color coded to show the current state of the connection between the UCCD 115 and the WAN 110, so the state of the connection is visible without restoring the display 410 to a window.

FIG. 5

Figure 5:
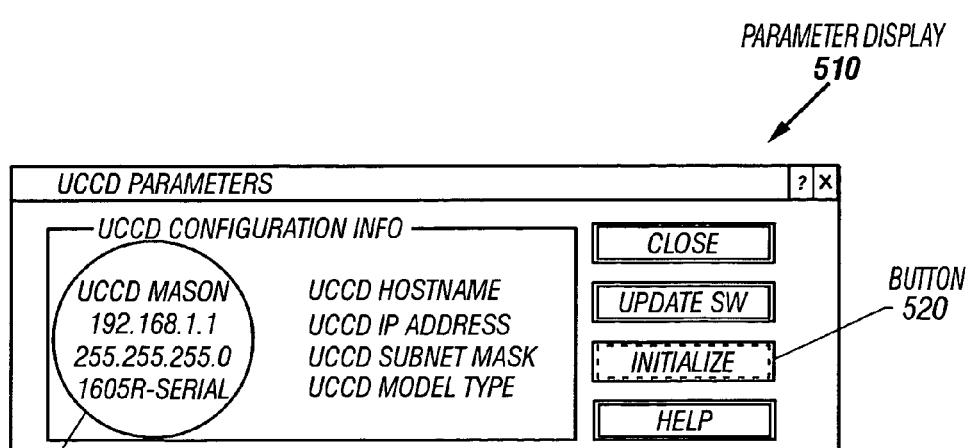
FIG. 5 illustrates a parameter display of the Manager program.

Clicking the UCCD button 430, invokes a parameter display 510 shown in FIG. 5, that shows general read-only parameters of the UCCD 115. Also this display 510 contains an Initialize button 520 to invoke the initialize display 610 of FIG. 6, to initialize or re-initialize the router 115.

FIG. 6

The initialize display of FIG. 6 includes controls to modify and re-write the boot-up configuration of the router 115. At the top of the display 610, there are radio buttons with allow one to configure the router 115. If router 115 has not already been otherwise configured to be recognizable by the host 120 and its UCCD Manager program 122, such as by the bootable configuration file described hereinabove then in order to initialize network communication with the router 115 button 614 must be activated and login information must be supplied to the router 115 by the program 122, as shown in the New Router Login area 620 of display 610. This will allow the Manager 122 to gain access to the router 115 and configure it with a UCCD startup file. Doing so will also allow the manager to change the login of the router 115 to that of a UCCD.

If router 115 has already been configured to contain special account and password information so as to be recognizable by the host 120 and the Manager program 122, the UCCD router 115 can be re-configured by activating button 612 and supplying information to the router 115 via the Router Configuration Info area 630 of the display 610. In this case, no login information is needed in the New Router Login portion 620 of display 610. Only the following can be changed in the Router Configuration Info area display 610: the routers name, the list of DNS servers, and a list of one or more WINS name servers for Microsoft networking.

Regardless of whether the configuring is an initial configuration or a re-configuration once the proper information is filled in for the display 610, clicking the Configure button 640 instructs the Manager 122 (FIG. 1) to generate a configuration data file and store it permanently on the router 115. From this point, the Manager program 122 will now recognize the router 115 so that it can be managed by the program 122.

FIG. 7

A Local Network Information display 710 shown in FIG. 7 can be viewed by clicking on button 425 of display 410 (FIG. 4). This display 710 shows the current host 120 that is running the Manager 122. In addition, the display 710 contains selections for exposing a host 120 on the local network 130 for the UCCD 115 to the WAN 110.

With button 720 selected, as shown in FIG. 7, all hosts 120 on the UCCD's network 130 are "hidden" from access by all hosts external to the UCCD's network 130. The hiding results from address translation described hereinabove. This is a security feature which is selected as a default. However, there are situations when a host 120 on the UCCD's network 130 is required to run a service that must be made available to the outside. With a click of radio button 730 the host 120 running the UCCD Manager program 122 can be exposed. Button 740 permits some other host 120 at a designated address to be exposed to the WAN 110. On the main display 410, there is a Lock icon 450 that visually indicates whether all hosts 120 are secured or whether some host 120 is exposed to the WAN 110.

FIG. 8

Figure 8:
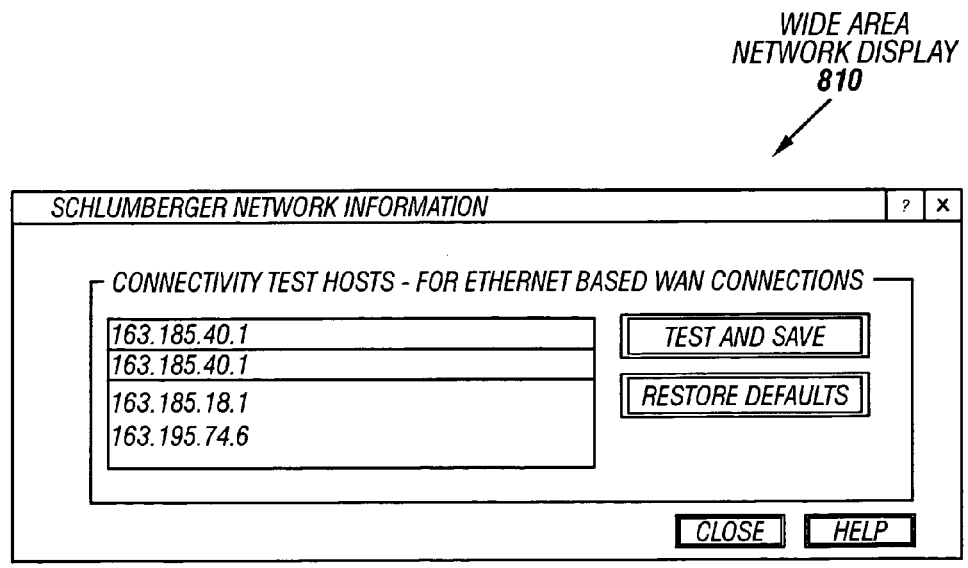
FIG. 8 illustrates a Aide area network information display of the Manager program.

A Wide Area Network Information display 810, shown in FIG. 8, can be viewed by clicking on button 430 of display 410 (FIG. 4). This display 810 shows a list of IP addresses that can be pinged by the Manager program 122 (FIG. 1) to test connectivity. When a connection is requested by a user, the Manager program 122 sets up the router 115, tests intermediate network interface devices 150 (FIG. 1), then performs an end-to-end test to ensure a viable connection exists.

FIG. 9

Figure 9:
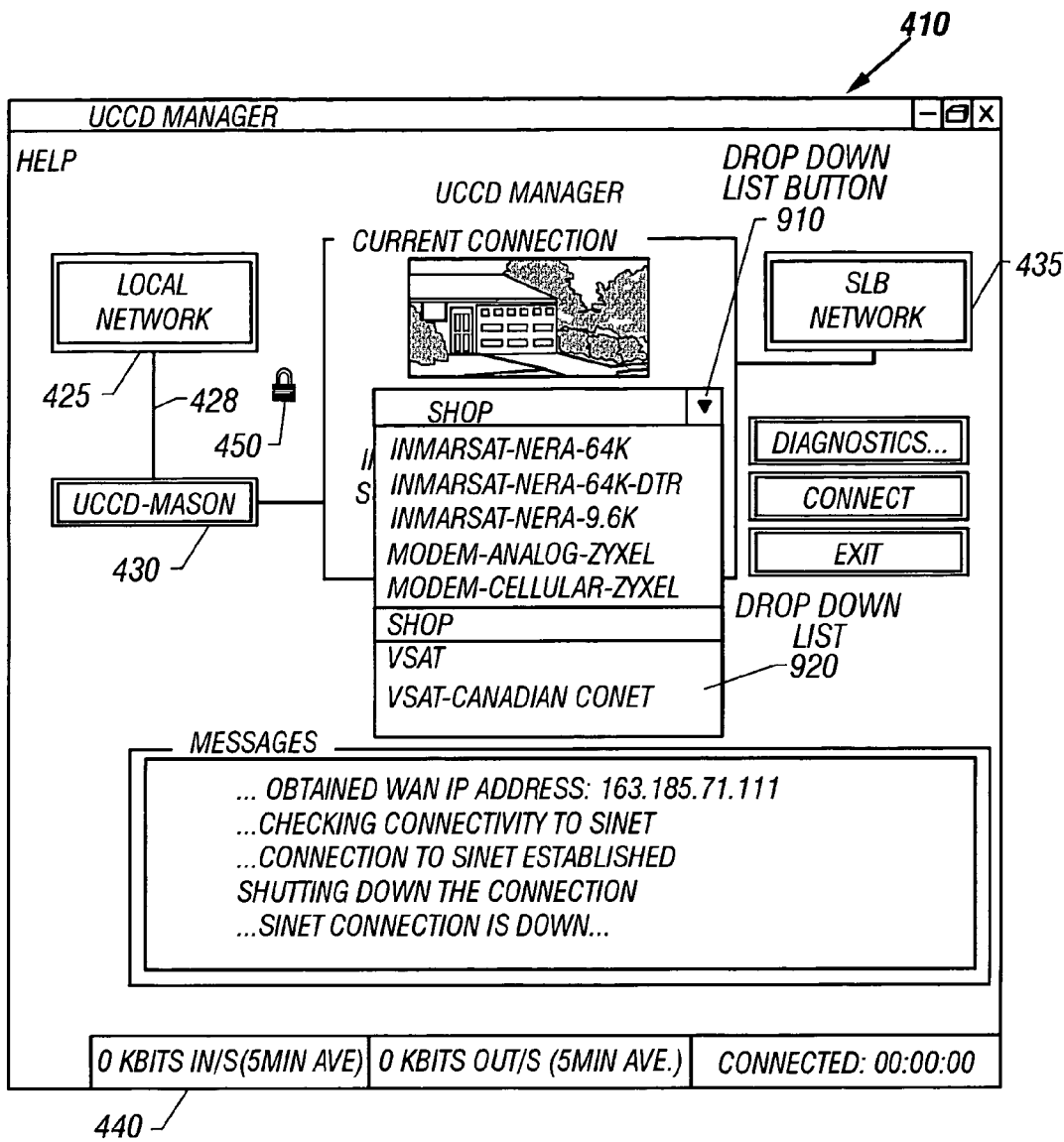
FIG. 9, illustrates another view of the main display of FIG. 4.

The UCCD Manager 122 (FIG. 1) supports a variety of network connections used by hosts 160 etc, (FIG. 1) on the WAN 110 (FIG. 1). Referring now to FIG. 9, another view is shown of main display 410. Clicking on the dropdown list button 910 shows a list of connections in drop down list 920 supported by this router 115 (FIG. 1). The list 920 is dynamically constructed and shows connection types only appropriate for the router 115. For example, in FIG. 9 a serial network interface card 150 (FIG. 1) is required for Inmarsat and Modem connections shown in the list 920. If router 115 had an ISDN network interface card 150 instead of a serial card, the list 920 would not contain the Inmarsat or Modem items, but instead would show ISDN as a connection option. This list 920 of connections is obtained from data in the UCCD.ini file 360 (FIG. 3). As new connection options become available, updating the INI file 360 is all that is required to support the new connections.

FIG. 10

Figure 10:
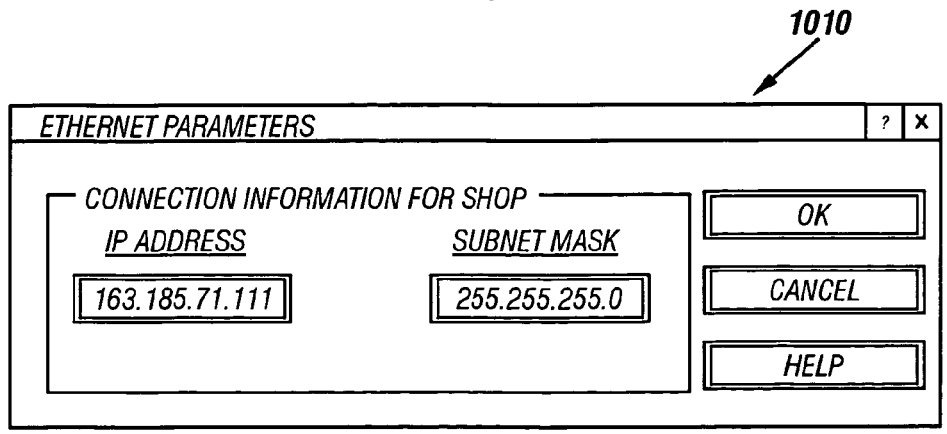
FIG. 10 illustrates an Ethernet parameters display of the Manager program.

Referring to FIG. 1, a setup button 450 is shown. When selecting a connection type that is Ethernet based, such as SHOP or VSAT connections in the embodiment of FIG. 9, the Ethernet parameters display 1010 shown in FIG. 10, displays IP address and Subnet Mask values.

FIG. 11

Figure 11:
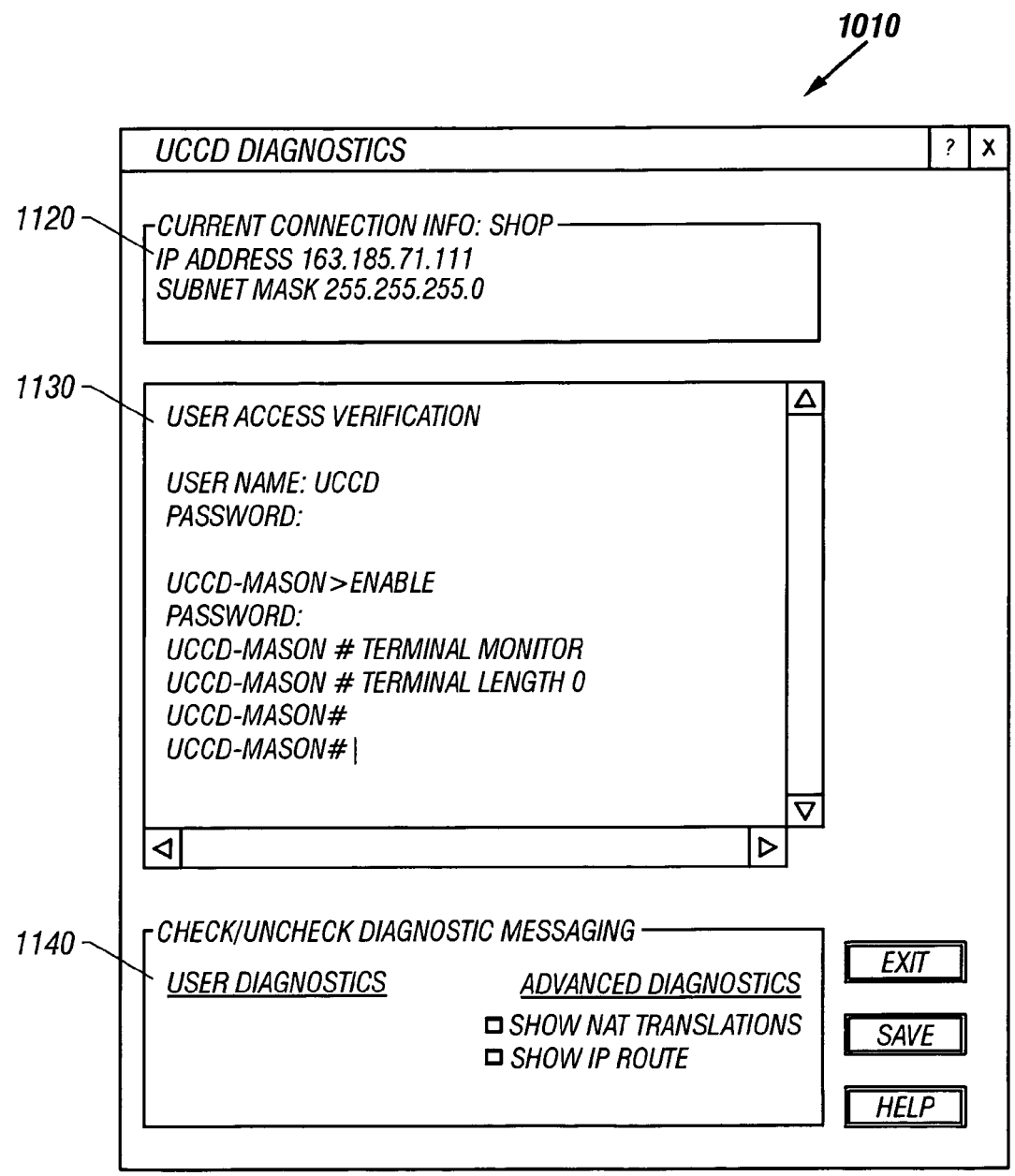
FIG. 11 illustrates a UCCD diagnostics display of the Manager program.

Referring to FIG. 1, a diagnostics button 460 is shown. Clicking on the diagnostics button 460 invokes the UCCD diagnostics display 1110 shown in FIG. 11. Typically enough information is contained in the Messages dialog box 420 (FIG. 1) on the main UCCD display 410 (FIG. 1), but should more serious problems arise, diagnostics can be run to assist in problem solving and results are shown in the diagnostics display 1110. At the top of the display 1110, a current connection info display area 1120 shows the current connection and appropriate connection information. The information displayed in area 1120 changes to reflect different parameters for different types of connections. At the center of the display 1110, a debug results display area 1130 shows results of debug information for the router 115 (FIG. 1). This information in area 1130 is the output of a Telnet session to the router 115 while debug is running. At the bottom of the display 1110 a debug options display area 1140 offers various debug options. Depending on the type of connection, the debug options change. For example, for ISDN the debug options area 1140 lists ISDN related setup and monitoring options. For modem debugging, the options area 1140 shows options dealing with dialer and connection events. Normally the interpretation of the debug output is analyzed by more experienced users or network professionals when dealing with problems the Manager 122 could not deal with internally.

FIG. 12

Figure 12:
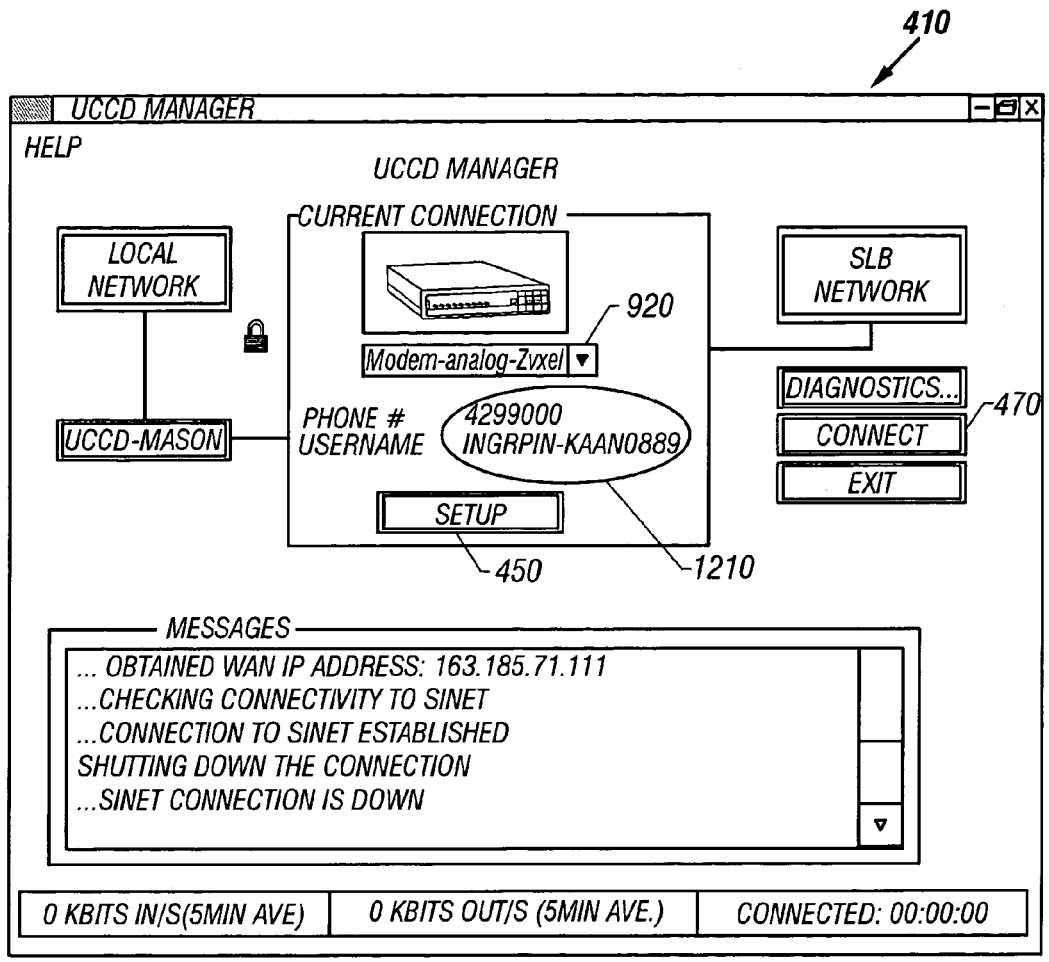
FIG. 12 illustrates another view of the main display of FIG. 4.

Referring to FIG. 12, the main display 410 is shown for a case where the user selected an analog modem connection from the drop down list 920. If the connection had been used previously, the Manager program 122 (FIG. 1) recalls the last Username and Phone Number called. Typically this is the same info needed to make the next call. To connect, the user clicks the Connect/Disconnect button 470, and the Manager 122 asks for the Password associated with the account. The Manager program 122 will then use this information to dial and authenticate a network connection. Once connected, if the user clicks the Connect/Disconnect button 470, the Manager 122 terminates the call immediately and removes any authentication from volatile memory 114 (FIG. 1) of the router 115. That is, for dialup connections, the UCCD Manager 122 passes username and account information necessary to authenticate connections to the router on as as-needed basis and does not store the dialup access information permanently on the router 115. In particular, if the router 115 is powered down or reset, no authentication information is left on it. As a result, passwords are not stored on the router. Since there is no login information kept on the router any third party attempting to use it would find no useful or service provider specific access information on it. Theft of a router or host with UCCD software on it does not provide the thief with any useful information for accessing the service provider. Only generic configuration information, such as its' name and local IP network setup are contained on the router 115 and host 120.

FIG. 13

Figure 13:
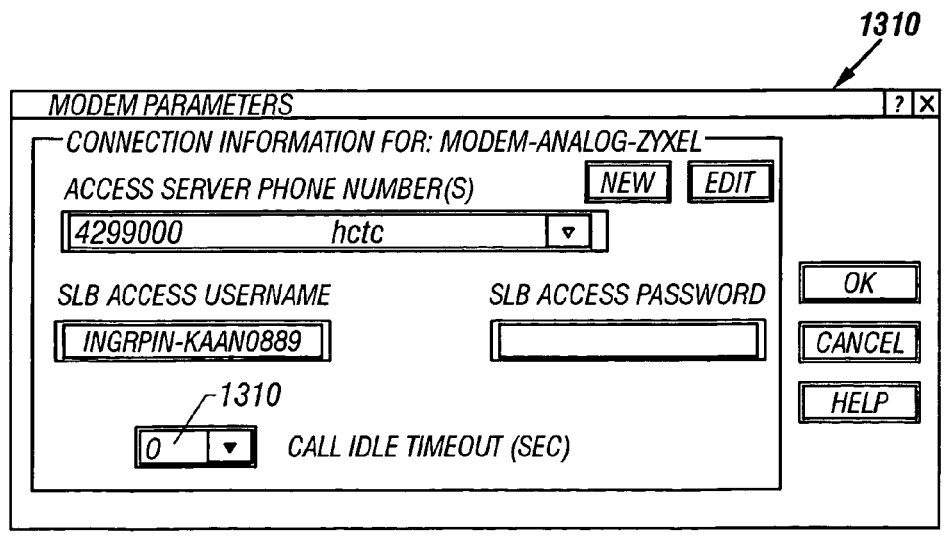
FIG. 13 illustrates a modem parameters display of the Manager program.

Clicking the setup button 450 when a modem connection is specified invokes the modem parameters display 1310, shown in FIG. 13, which provides a listing of the most recent phone numbers called and an associated reminder text to assist the user identify the phone number. It also contains the Username and Password information needed to authenticate the connection. To prevent excessive phone charges, the UCCD 115 (FIG. 1.) is configured to time out a dialup connection after a preset amount of time (typically about 5 minutes for a modem call). If there is no network activity during the timeout period tire UCCD 115 hangs up the call. When network activity subsequently reoccurs, the UCCD 115 auto-dials the connection and re-establishes the connection without user intervention. The call idle timeout drop down list presents a choice of common timeout values, with 0 being "no timeout".

FIG. 14

Figure 14:
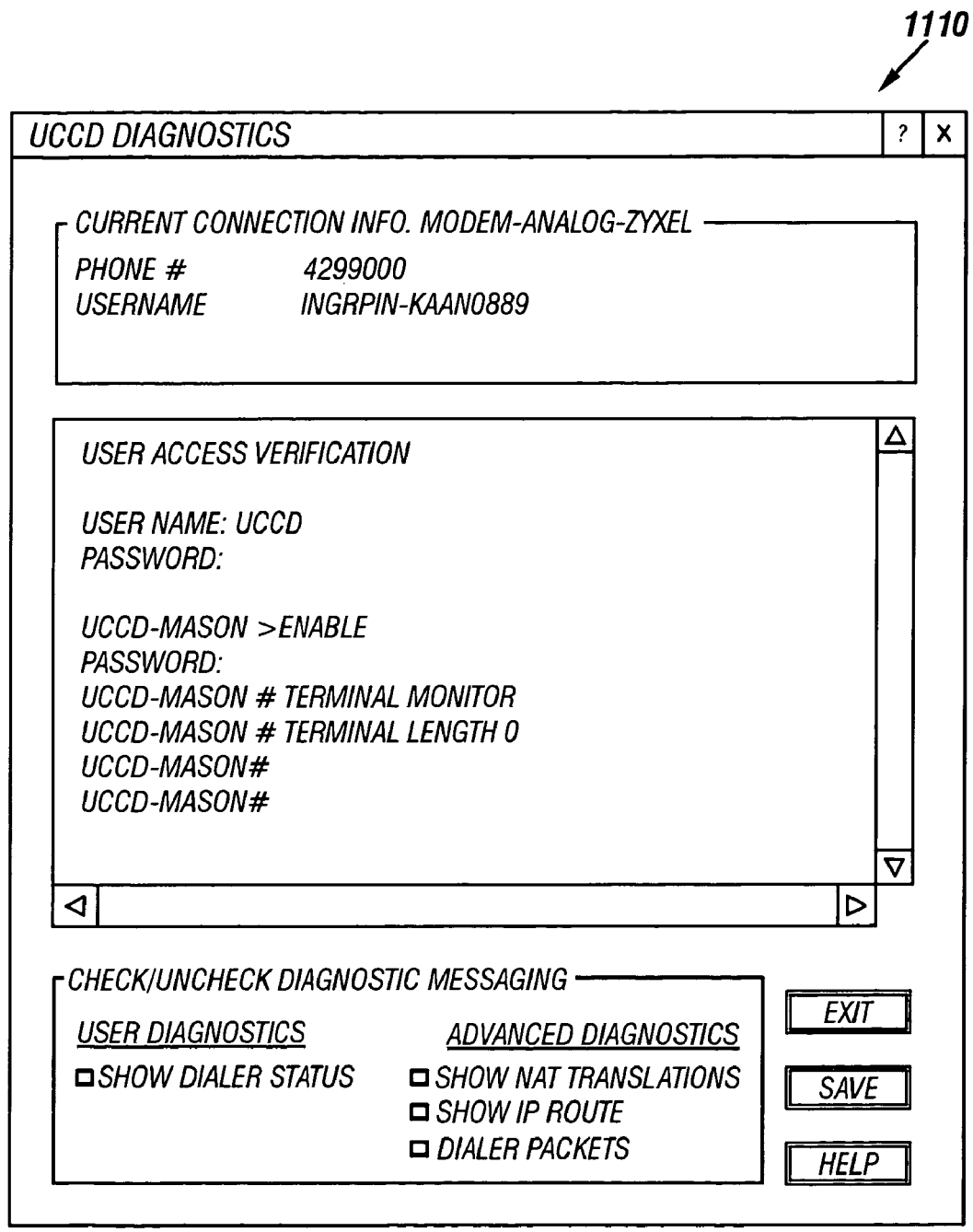
FIG. 14 illustrates another version of the diagnostic display of FIG. 11.

Referring to FIG. 14, another version of the diagnostic display 1110 is shown for a case of troubleshooting a dialup modem connection. At the top of the display 1110, the current connection info display area 1120 shows the current connection and appropriate connection information appropriate for dialup connections. At the center of the display 1110, debug results display area 1130 shows results of debug information for the router 115 (FIG. 1) as appropriate for dialup connections. At the bottom of the display 1110, debug options display area 1140 shows debug options appropriate for dialup connections.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

It should be understood from the foregoing that since data acquisition personnel have expertise in fields other than network interfacing, and they are not well suited to handle frequent changing of network interface parameters, it is therefore advantageous that the system, method and computer program product of the present invention provides for easily configuring and re-configuring the router, even by a non-experts, to accommodate the variations in parameters for changing from one network interface device to another. Also, despite changes in network connections, the hosts on the LAN do not have to change configuration to communicate on the WAN. That is, the system provides for automatically configuring the router to substitute a network address of the router in place of a network address of the host, so that the host can communicate to the WAN. Translation of addresses tends to hide the devices on the LAN from the WAN, which helps conserve public network addresses. Furthermore, by permitting the configuration of hosts on the LAN to remain static, communication is not disrupted between a host and a data acquisition device on the LAN even during configuring for a new network connection to the WAN. It is another advantage of the foregoing that the first router isolates the first LAN from the WAN connection, so that if there are problems on the WAN, the nodes on the first LAN are not exposed to them.

The description of the present embodiment has been presented for purposes of illustration, but is not intended to be exhaustive or to limit the invention to the form disclosed. Many modifications and variations will be apparent to those of ordinary skill in the art. For example, it should be understood that while the data acquisition unit 105 is shown as a mobile unit, it would be within the spirit and scope of the invention to encompass an embodiment wherein the unit is not mobile. For example, the division of configuring may vary among the configuring responsive to instructions in bootable file 116 and that which is responsive to the instructions in the file 375 or in individual telnet 354 or SNMP 356 commands sent to the router 115 by the host 120. In various contexts, the "configuring instructions" referred to herein may include instructions in a file, individual instructions, or a series of instructions. To reiterate, the embodiments were chosen and described in order to best explain principles of the invention, the practical application, and to enable others of ordinary skill in the art to understand the invention.

Various other embodiments having various modifications may be suited to a particular use contemplated, but may be within the scope of the present invention as claimed.

What is claimed is:

1. A system comprising:
   a first network;
   a data acquisition device connected to the first network;
   a second network;
   a mobile data acquisition unit consisting of a router and at least one host wherein the at least one host is configured to communicate with the data acquisition device through the first network, wherein the router is configured to communicate with the at least one host, and wherein the router isolates the at least one host and the data acquisition device from the second network;
   a template file comprising an operating system command associated with the router, wherein the operating system command comprises a variable; and
   a manager program for executing by a processor of the at least one host to assemble first configuring instructions from the template file for configuring the router, wherein network communication is established among the at least one host, the router and a host on the second network responsive to the configuring of the router, and the configuring does not disrupt communication on the first network between the at least one host and the data acquisition device,
   wherein the manager program interprets the variable during assembly of the first configuring instructions,
   wherein the at least one host has a predetermined configuration, including parameters defining a certain identity, and the configuring includes setting parameters in the router that assign the certain identity to the router, so that the network communication between the at least one host and the router is established by the at least one host recognizing the router identity.

2. The system of claim 1, wherein the configuring includes setting parameters in the router for a network connection between the router and the second network, so that the network communication between the second network host and the router is established by the host on the second network recognizing the router identity via the network connection.

3. The system of claim 1, wherein the router comprises a processor, and wherein execution of the configuring instructions by the router processor automatically performs the router configuring.

4. The system of claim 3, wherein the system comprises second configuring instructions for executing by the router processor upon booting.

5. The system of claim 4, wherein the router comprises a storage unit, and the second configuring instructions include instructions stored in a configuration file on the router storage unit.

6. The system of claim 4, wherein the router comprises a reader for reading a portable storage device, and the second configuring instructions include instructions stored on an external storage device readable by the router's reader.

7. The system of claim 1, wherein the first configuring instructions include parameters for performing a network login to initialize the network communication on the first network between the router and the at least one host.

8. The system of claim 1, wherein the configuring instructions include configuring the router to substitute a network address of the router in place of a network address of the at least one host for communicating from the at least one host to the host on the second network.

9. The system of claim 1, wherein the configuring includes configuring the router to not send addresses of nodes in the first network to other routers.

10. The system of claim 1, wherein the data acquisition device comprises a down-hole transmitter.

11. The system of claim 1,
    wherein the mobile data acquisition device comprises a plurality of network interface cards,
    wherein each of the plurality of network interface cards is configured to enable communication between the first network and the second network over one of a plurality of connection mediums;
    wherein the router is configured to interface with each of the plurality of network interface cards,
    wherein the router communicates with the second network using a selected one of the plurality of network interface cards.

12. The system of claim 11, wherein each of the plurality of connection mediums is one selected from a group consisting of: satellite, ISDN, DSL, cable modem, wireless, and modem.

13. A method for managing communication comprising:
    executing instructions by at least one host to assemble first configuring instructions for a router from a template file, wherein the router and the at least one host are located in a mobile data acquisition unit consisting of the router and the at least one host, wherein the router isolates the at least one host and a data acquisition device from a second network, wherein the data acquisition device, the router and the at least one host are connected to a first network, and the data acquisition device and the at least one host are capable of network communication with one another thereon, and wherein the router is connected to the second network having a host, wherein the template file comprises an operating system command associated with the router and wherein the operating system command comprises a variable;
    sending the first configuring instructions by the at least one host to the router; and
    executing configuring instructions by the router, including the first configuring instructions, wherein executing the configuring instructions by the router comprises:
       configuring the router and establishing communication between the at least one host and the router, wherein the configuring does not disrupt the network communication between the at least one host and the data acquisition device on the first network,
    wherein a manager program, for execution by a processor of the at least one host, interprets the variable during assembly of the first configuring instructions,
    wherein the at least one host has a predetermined configuration, including parameters defining a certain identity, and wherein the step of executing the configuring instructions by the router comprises:
       assigning the certain identity to the router, so that the network communication between the at least one host and the router is established by the at least one host recognizing the router identity.

14. The method of claim 13, wherein the step of executing the configuring instructions by the router comprises:
making a network connection between the router and the second network, so that the network communication between a host on the second network and the router is established by the host on the second network recognizing the router identity via the network connection.

15. The method of claim 14, wherein certain ones of the configuring instructions include instructions for executing by the router upon the router booting, and executing the configuring instructions by the router comprises executing the certain ones of the configuring instructions.

16. The method of claim 15, wherein the router has a storage unit, and the certain ones of the configuring instructions include instructions stored in a configuration file on the router storage unit.

17. The method of claim 15, wherein the router has a reader, and the certain ones of the configuring instructions include instructions stored on an external storage device readable by the router's reader.

18. The method of claim 15, wherein the step of executing the configuring instructions by the router comprises:
logging in to the router to initialize the network communication on the first network between the router and the at least one host.

19. The method of claim 18, wherein the step of executing the configuring instructions by the router comprises the:
configuring the router to substitute a network address of the router in place of a network address of the at least one host for communicating from the at least one host to the host on the second network.

20. The method of claim 19, wherein the step of executing the configuring instructions by the router comprises the:
configuring the first router to not send addresses of nodes in the first network to other routers.

21. The method of claim 13, wherein the data acquisition device comprises a down-hole transmitter.

22. The method of claim 13, further comprising:
selecting one of a plurality of network interface cards to obtain a selected network interface card; and
configuring the router to communicate wit the second network based on the selected network interface card,
wherein the mobile data acquisition device comprises the plurality of network interface cards,
wherein each of the plurality of network interface cards is configured to enable communication between the first network and the second network over one of a plurality of connection mediums;
wherein the router is configured to interface with each of the plurality of network interface cards.

23. The method of claim 22, wherein each of the plurality of connection mediums is one selected from a group consisting of: satellite, ISDN, DSL, cable modem, wireless, and modem.

* * * * *

UNITED STATES PATENT AND TRADEMARK OFFICE
CERTIFICATE OF CORRECTION

| | | |
|---|---|---|
| PATENT NO. | : 7,366,769 B2 | Page 1 of 1 |
| APPLICATION NO. | : 09/755002 | |
| DATED | : April 29, 2008 | |
| INVENTOR(S) | : Keith G. Kaan et al. | |

It is certified that error appears in the above-identified patent and that said Letters Patent is hereby corrected as shown below:

Title Page, section (56) References Cited, Other Documents, insert

-- S. Murchie, J.T. Provost T. Burke, G. Karr, S.O. Alam, D. Scheibner, A. Citerne, "Innovations in Global Electronic Data Delivery," "SPE 56686," presented at the 1999 "SPE Annual Technical Conference and Exhibition," Houston, TX, October, 1999. --

In the Claims:

In Claim 12, column 16, line 29, after the word "and" insert the word -- voiceband --

In Claim 22, column 18, line 14, "wit" should be -- with --

In Claim 23, column 18, line 26, after the word "and" insert the word -- voiceband --

Signed and Sealed this

Twenty-second Day of July, 2008

JON W. DUDAS
*Director of the United States Patent and Trademark Office*